United States Patent [19]
Lee et al.

[11] 4,384,778
[45] May 24, 1983

[54] INTEGRAL, PLANAR ELECTROMAGNETIC CAMERA ELEMENT/ACTUATOR

[75] Inventors: James K. Lee; Peter J. Pritchard, both of Rochester, N.Y.

[73] Assignee: Eastman Kodak Company, Rochester, N.Y.

[21] Appl. No.: 319,342

[22] Filed: Nov. 9, 1981

[51] Int. Cl.³ .......................... G03B 9/08; G03B 9/10; G03B 9/40; G05L 25/02
[52] U.S. Cl. .................................... 354/230; 354/234; 354/247; 354/250; 350/269; 350/272
[58] Field of Search ............... 354/230, 234, 235, 247, 354/250, 271; 350/269, 272

[56] References Cited

U.S. PATENT DOCUMENTS

| | | | |
|---|---|---|---|
| 3,081,683 | 3/1963 | Horton et al. | 95/59 |
| 3,987,473 | 10/1976 | Kondo | 354/234 |
| 4,024,552 | 5/1977 | Kondo | 354/234 |
| 4,333,722 | 6/1982 | Lee | 354/234 |

*Primary Examiner*—William B. Perkey
*Attorney, Agent, or Firm*—Douglas I. Hague

[57] ABSTRACT

An exposure regulating element for a photographic camera is formed from a one piece sheet of light weight, non-magnetic, electrically conductive metal to provide a light regulating blade, a flexure hinge for urging the blade toward an initial aperture covering position and a conductor coil which cooperates with a permanent magnet for generating a force to move the blade away from the initial position. In a preferred embodiment a pair of exposure regulating elements each providing integral light regulating, flexure hinge and conductor coil means move in opposite directions to cover and uncover an exposure operation.

8 Claims, 4 Drawing Figures

INTEGRAL, PLANAR ELECTROMAGNETIC CAMERA ELEMENT/ACTUATOR

FIELD OF THE INVENTION

This invention relates to camera exposure control elements and electromagnetic actuators therefor. More particularly, the invention relates to an integral, planar camera exposure control element and electromagnetic actuator.

DESCRIPTION RELATIVE TO THE PRIOR ART

Commonly assigned U.S. patent application Ser. No. 219,168 filed Dec. 22, 1980, in the name of J. Kelly Lee and entitled "Method of Controlling Electromagnetic Actuator In A Camera, and Actuator Controllable Thereby", now U.S. Pat. No. 4,333,722 discloses an electromagnetic actuator for moving an element such as an aperture blade, shutter blade, or the like in a photographic camera. The actuator includes a planar conductor coil formed by photofabrication techniques on an insulating coil support member. A flexure hinge, which may be formed by an extention of the coil support member, provides a low friction mounting and an automatic restoring force to return the armature to an initial position after each operation. The camera element is preferably a combined aperture/shutter blade that is carried on an end of the coil support member opposite the conductor coil and forms a tapered aperture for progressively uncovering a fixed aperture in a camera mechanism plate. In a preferred embodiment of the Lee application, the current applied to the conductor coil is controlled by pulse duration modulation, the pulses being generated by a digital computer. The actuator acts as a digital-to-analog converter, with the aperture size determined by the duration of the pulses applied to the actuator and the shutter time determined by the number of pulses applied to the actuator.

The apparatus disclosed in the Lee application provides several important advantages. The planar construction of the camera exposure control element and conductor coil is very compact. The actuator operates with high electrical efficiency and force and is capable of being driven directly by digital signals, thereby obviating the need for expensive digital-to-analog conversion when the actuator is driven by a digital signal source. The copper used to form the conductor coil in the Lee invention is a high density material which increases the mass of the actuator. The present invention provides improvements to the apparatus disclosed in the Lee application in avoiding the relatively complex and costly photofabrication of the conductor coil and in reducing the electromagnetic force required to rapidly move the actuator/blade mechanism.

SUMMARY OF THE INVENTION

The present invention provides an improved planar camera exposure control element/electromagnetic actuator apparatus having the conductor coil, camera exposure control means and restoring spring integrally formed from a single piece of light weight, electrically conductive, non-magnetic metal. The coil consists of a single "turn" conductor whose effective forces are generated along two coplanar conductor legs. The single "turn", two conductor leg construction allows the coil to be made thin without reverse bends and protective insulation between overlapping layers. This construction provides an exposure control element/electromagnetic actuator apparatus that is, (1) lighter in weight, thus requiring less actuating force, and (2) can be fabricated at lower cost than prior art planar camera exposure control element/electromagnetic actuator devices.

In a preferred embodiment of the invention, two non-magnetic, electrically conductive, movable metal blade elements, each providing integral coil, exposure control and restoring force means, are symmetrically mounted for lateral movement over a camera mechanism plate which forms a fixed, maximum aperture. The two blade elements each move freely in separate air gaps formed by a pair of permanent magnets and associated "U" shaped keepers. Stops are provided to limit the opening travel movement of each blade's exposure control means to the magnetic region. Portions of each blade's restoring force means cooperate with the magnets and keepers to absorb energy and thereby eliminate bounce at the end of the closing travel movement of the exposure control means.

The invention and its features and advantages will become more apparent by referring to the accompanying drawings and to the ensuing detailed description of illustrative embodiments of the invention.

DETAILED DESCRIPTION OF THE INVENTION

Because camera exposure control elements, electromagnetic actuators and electromagnetic control circuitry are well known, the present description will be directed in particular to elements forming part of, or cooperating more directly with, apparatus in accordance with the present invention. It is to be understood that camera elements and circuit elements not specifically shown or described may take various forms well known to those having skill in the art.

Figure 1:
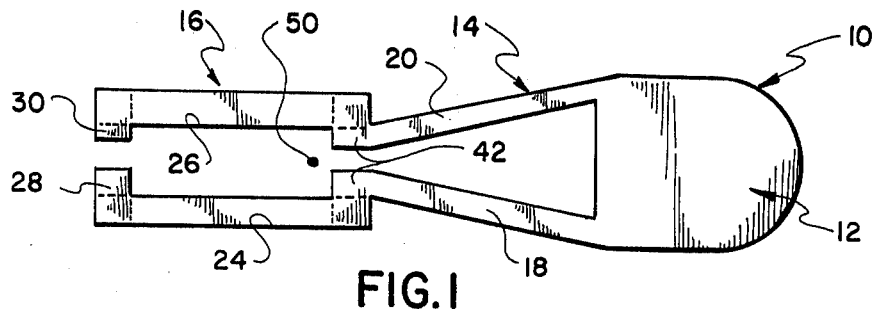
FIG. 1 is a plan view of one embodiment of the present invention in which a single, light weight, electrically conductive, non-magnetic, metal blade element provides integral camera exposure control, coil and restoring force means.

FIG. 1 of the drawings is a plan view of a camera element 10 stamped from a thin sheet of non-magnetic material having the following properties:

(1) light weight;
(2) good electrical conductivity;
(3) good fatigue characteristics;
(4) high stiffness index; and
(5) formability by low cost fabrication techniques.

Examples of materials useful in fabricating an element 10 according to the teachings of the present invention are 1 to 3 mil thick sheets of titanium or aluminum. An especially useful material is 2 mil thick hard aluminum foil. In the embodiment shown in FIG. 1, the element 10 includes a blade portion 12, a conductor coil portion generally designated 14 and a flexible hinge portion 16.

The conductor coil portion 14 includes two substantially co-planar conductor leg portions 18 and 20 and the flexible hinge portion 16 comprises two substantially co-planar leaves 24 and 26 having electrical contact pads 28 and 30, respectively, at the ends thereof. After or during the stamping procedure, the element 10 is bent in the places indicated by the dotted lines in FIG. 1 so that it assumes the shape best shown in FIG. 2. The element 10 is then mounted on a mechanism plate 32 which provides an aperture 34. The mechanism plate, made from 24 gauge mild steel, is covered with a layer of electrically insulating porcelain enamel. The electrical contact pads 28 and 30 are bonded to the plate 32, and the pads 28 and 30 are electrically connected to a control circuit, schematically shown as a battery 36 and a switch 38. To provide rigidity to the element 10 an insulator block 40 is cemented between leaves 24 and 26 of the flexure hinge 22 at the points 42 where the leaves meet the legs 18 and 20 of the conductor coil 14.

Figure 2:
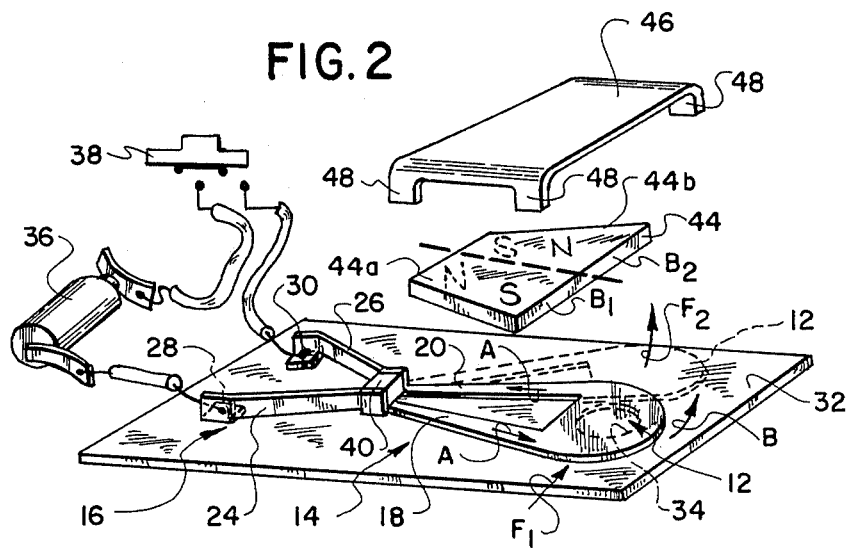
FIG. 2 is an exploded, perspective view showing the mounting arrangement of the metal blade element of FIG. 1 on a camera mechanism plate.

A permanent ceramic magnet 44, which may comprise two adjacent pieces, is magnetized in a direction perpendicular to its top and bottom surfaces (as viewed in FIG. 2). One-half of magnet 44, designated 44a, is magnetized with the south magnetic pole on the top and the north magnetic pole on the bottom, and the other half, designated 44b, is magnetized with the north magnetic pole on the top and the south magnetic pole on the bottom. The magnet 44 is cemented to the underside of a holder 46 made from 24 gauge mild steel. Magnet holder 46 has four ears 48 extending downwardly from its bottom surface and bonded to plate 32 to suspend the magnet 44 over coil 14 with an armature gap between the magnet 44 and the mechanism plate 32. The magnet holder 46 is positioned on the mechanism plate 32 so that the magnet portion 44a, which produces a first magnetic field $B_1$ generally perpendicular to the plane of the coil 14, lies in the vicinity of coil leg portion 18 and magnet portion 44b, which produces a second magnetic field $B_2$ generally parallel to the first magnetic field, lies in the vicinity of the coil leg portion 20.

When the switch 38 is closed, a current i from battery 36 flows in a counterclockwise direction, as indicated by the arrows A, in the leg portions 18 and 20 of the coil 14. As a result of the current i flowing in magnetic field $B_1$, a force $F_1$ is generated on the leg portion 18 of the coil 14, tending to pivot the blade portion 12 around a virtual pivot point 50 located approximately at the intersection of the planes of coil leg portions 18 and 20. A force $F_2$ generally in the same direction as force $F_1$, is generated on the leg portion 20 by current i flowing in magnetic field $B_2$. The currents in the other portions of the coil 14 likewise generate forces on the coil. However, the major components of these forces are perpendicular to the direction of coil movement and therefore are negligible in considering armature performance. The forces $F_1$ and $F_2$ act together to rotate the armature 14 around the virtual pivot point in the direction of arrow B to displace the blade portion 12 with respect to the aperture 34 and therefore to uncover the aperture 34 as shown in dotted lines in FIG. 2. By controlling the amount of current i in coil 14, and hence the amount of movement of the blade portion 12, the apparatus may be used to control the aperture size, the exposure duration, or both. Preferably, the mass of the blade element 10 is selected to be balanced about its virtual pivot point 50 so that the element 10 is not subject to undesirable forces due to gravity or acceleration.

When the switch 38 is opened, current ceases to flow in coil 14 and the flexure hinge 16 returns the blade portion 12 to its original position shown in solid lines in FIG. 2. For faster operation, the current can be momentarily reversed in coil 14, by providing suitable current switching means in the control circuit, to provide an extra return force on the armature. Faster operation can also be achieved by providing a pair of blade elements 10 which move in opposite directions on the plate 32 to uncover and cover the exposure aperture 34. However, a two bladed arrangement using the blade elements 10 shown in FIGS. 1 and 2 may be disadvantageous in that the blades may rub on one another in the drive region of their coils and it may prove difficult to control the end points of the blade travel.

Figure 3:
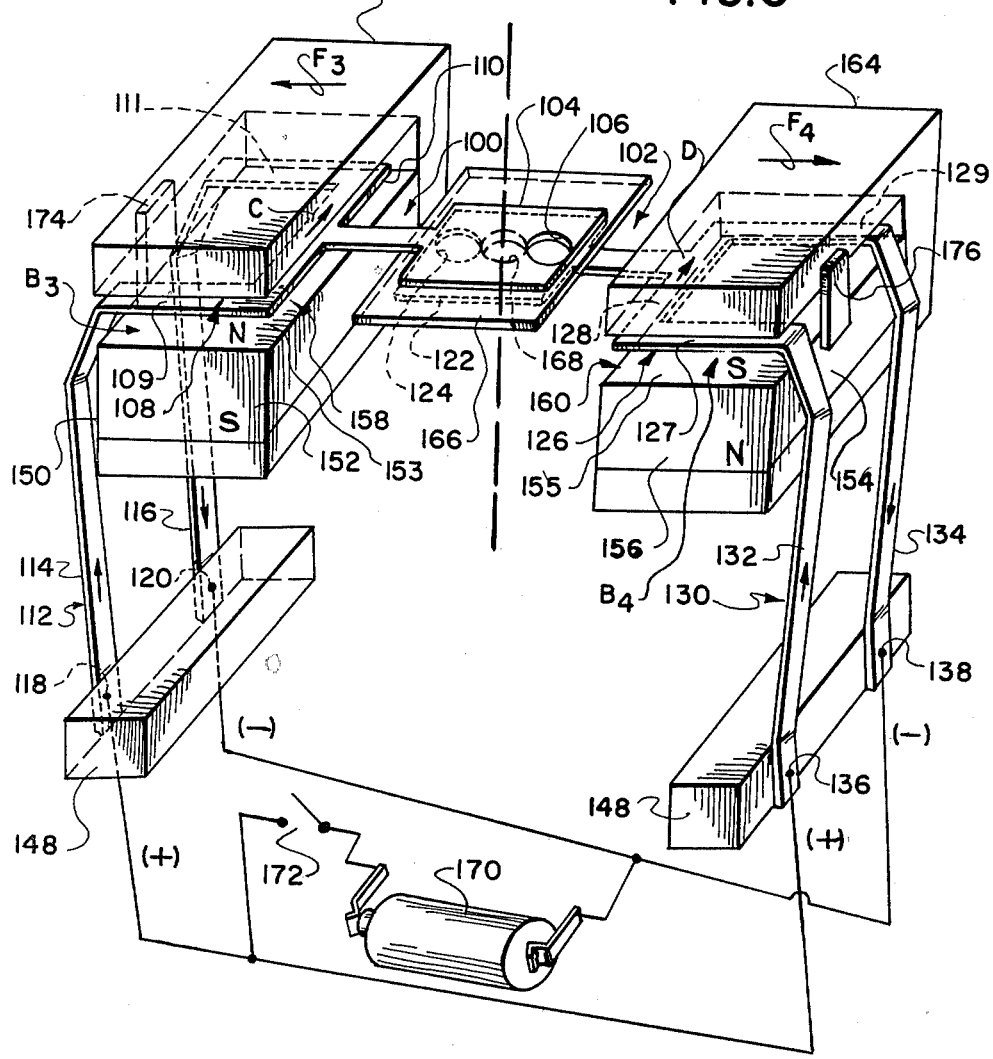
FIG. 3 is a perspective view of a second embodiment of the invention employing two metal blade elements each providing integral camera exposure control, coil and restoring force functions.

A presently preferred two bladed embodiment of the invention is shown in a perspective view in FIG. 3. The apparatus includes two metal blade elements 100 and 102, each stamped from metal foil having the properties listed in the description relative to the blade element 10 illustrated in FIGS. 1 and 2 and each integrally providing spring, coil and exposure control means. As illustrated in the drawing, metal blade element 100 includes a horizontally extending blade portion 104, a horizontally extending drive coil portion generally designated 108, and a vertically extending spring portion 112. The blade portion 104 defines an aperture 106, and the spring portion 112 comprises two substantially co-planar flexure leaves 114 and 116 having electrical contact tabs 118 and 120, respectively, at the ends thereof. Similarly, metal blade element 102 includes a horizontally extending blade portion 122, a horizontally extending drive coil portion designated generally 126, and a vertically extending spring portion 130. The blade portion 122 defines an aperture 124, and the spring region 130 comprises two substantially co-planar flexure leaves 132 and 134 with respective contact tabs 136 and 138.

The electrical contact tabs 118, 120, 136 and 138 are bonded to an insulated mechanism plate 148 with the flexure leaves 114 and 116 positioned adjacent sidewall 150 of a permanent magnet 152 and the flexure leaves 132 and 134 positioned adjacent sidewall 154 of a permanent magnet 156. The magnets 152 and 156 are magnetized in a direction perpendicular to their top and bottom surfaces with the north magnetic pole on the top and the south magnetic pole on the bottom of magnetic 152 and the south magnetic pole on top and the north magnetic on the bottom of magnet 156. The magnet 152 produces a magnetic field $B_3$ generally perpendicular to the plane of drive coil 108 and the magnet 156 produces a magnetic field $B_4$ generally perpendicular to the plane of drive coil 126 and of opposite polarity to the field $B_3$. The drive coil 108 is positioned in an air gap 158 formed by the magnet 152 and by an associated "U" shaped iron or steel keeper 162 so that a conductor leg portion 110 is substantially parallel with major surface 153 of the magnet 152. Similarly, the drive coil 126 is positioned in air gap 160 formed by the magnet 156 and by an associated "U" shaped iron or steel keeper 164 so that a conductor leg portion 128 is substantially parallel with major surface 155 of the magnet 156. The cantilevered blade portions 104 and 122 respectively extend over and under an electrically insulative plate 166, provided with an aperture 168.

When the positive terminal of an electrical supply, such as battery 170, is connected, via switch 172, to the electrical contact tabs 118 and 136 and the negative terminal of the supply is connected to the electrical contact tabs 120 and 138, current i flows counterclockwise in the drive coil 108 and clockwise in the drive coil 126 as indicated by the arrows C and D, respectively. The current flowing in the conductor leg portion 110 of drive coil 108 generates a force $F_3$ which causes the element 100 to move to the left (as viewed in FIG. 3). The current flowing in the conductor leg portion 128 of drive coil 126 generates a force $F_4$ which causes the element 102 to move to the right. The current flowing in other portions of the coils 108 and 126 within the magnetic fields $B_3$ and $B_4$, for example in the conductor leg portions 109 and 111 of coil 108 and conductor leg portions 127 and 129 of coil 126 likewise generates forces. However the forces generated in conductor leg portions 109 and 127 tend to be cancelled out by the forces generated in conductor leg portions 111 and 129, respectively. The left and right movements of the elements 100 and 102 cause the blade portions 106 and 122 to move from initial positions in which they cover the fixed aperture 168 to a position in which the aperture 168 is aligned with the blade apertures 106 and 124. A pair of blade stops 174 and 176 limits the opening movement of the coils 108 and 126 to the magnetic regions. Because the forces on the coils 108 and 126 are proportional to the current flowing therein the position of the coils, and hence the extent to which the plate aperture 168 is uncovered by the blade apertures 106 and 124, can be controlled by controlling the current supplied to the drive coils 108 and 126.

Figure 4:
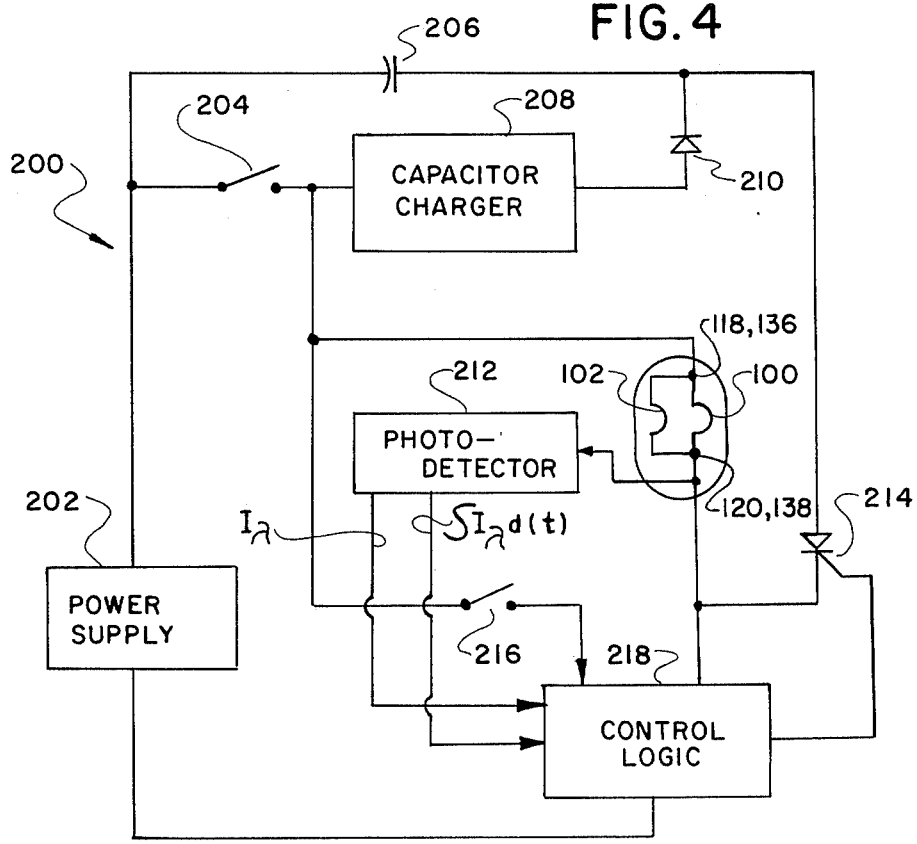
FIG. 4 is a schematic diagram of a control circuit used to drive the metal blade elements illustrated in FIG. 3.

As will be readily apparent to those skilled in the art, left and right movements of the elements 100 and 102 can also be achieved with the magnets 152 and 156 having the same polarities provided that the current flow in both the two coils 108 and 126 is clockwise or counterclockwise as is necessary to achieve the desired left and right movements. Furthermore, while the coils 108 and 126 are shown in FIGS. 3 and 4 as being connected in parallel, the coils 108 and 126 could also be connected in series. The choice of series or parallel connection can be made by the circuit designer to optimize circuit performance.

The two bladed arrangement shown in FIG. 3 provides a number of advantages. The blade elements 100 and 102, which have local stiffness but overall flexibility, can be quickly and accurately adjusted by bending the flexure leaves 114, 116, 132 and 134. Frictional losses are minimized because the cantilevered blade portions 104 and 124 contact only the plate 166 which lies outside the respective active drive regions 110 and 128 of the coils 108 and 126. The aforementioned two advantages in turn provide a third advantage, namely that the flatness tolerance for the armature and blade portions of the elements 100 and 102 can be increased. Another advantage is that the flexure leaves 114, 116, 132 and 134, in addition to providing position restoring force, absorb energy, via their respective engagement with the sidewalls 150 and 154 of the magnets 152 and 156, to eliminate bounce after the closure of the aperture 168.

FIG. 4 is a schematic diagram of an illustrative control circuit for driving the metal blade elements of the present invention. The control circuit will be described in conjunction with the blade elements 100 and 102 shown in FIG. 3. However, it will be understood that the control circuit could be used to drive other blade elements such as the blade element 10 shown in FIG. 1. The control circuit, designated generally 200, comprises a power supply 202, a power switch 204, a capacitor 206, a capacitor charger 208, a diode 210, a photodetector 212, a silicon controlled rectifier (SCR) 214, a shutter open switch 216 and control logic 218.

In operation, when the power switch 204 is closed in response to a first range of movement of a two-stage shutter release button (not shown) power is supplied from power supply 202 (for example, a battery) to the capacitor charger 208, which starts to charge up the capacitor 206 through diode 210. When the shutter open switch 216 is closed during a second range of movement of the shutter release button a signal pulse is applied to the control logic, which comprises two threshold switches and a power latch switch. Upon receipt of the signal pulse, the power latch switch is closed coupling the battery to the contact tabs 118, 120, 136 and 138. Battery current then flows in a counterclockwise direction in coil 108 and in a clockwise direction in coil 126, driving the respective coils 108 and 126 in left and right directions, respectively, thereby causing the aperture 168 to be uncovered relatively slowly. The photodetector 212, comprising a phototransistor and an integrating capacitor, is also activated upon the closing of the switch 216 and provides the control logic with a signal $I\lambda$ representative of the instantaneous magnitude of the scene brightness and a signal $\int I\lambda \, d(t)$ representative of the cummulative magnitude of the scene brightness time product. The control logic 218 tracks the signals $I\lambda$ and $\int I\lambda \, d(t)$ and, at an appropriate time determined by the threshold switches, provides command signals which interrupt the flow of battery current to the coils 108 and 126, and activate the gate electrode of the SCR 214 to turn it on. When the SCR 214 conducts, the capacitor 206 discharges, providing a reverse current flow in coils 108 and 126, thereby rapidly driving the respective coils 108 and 126 in respective right and left directions, so that the blades again cover the aperture 168. The flexure leaves 114, 116, 132, and 134 provide additional restoring forces and absorb energy, via their engagement with side walls 150 and 154 of the magnets 152 and 156, to eliminate bounce after the rapid closure of the blade portions 104 and 122.

The invention has been described in detail with particular reference to preferred embodiments thereof but it will be understood that variations and modifications can be effected within the spirit and scope of the invention. For example two blade elements similar to the blade elements 100 and 102 can be mounted in a common air gap formed by one permanent magnet and keeper assembly. The two blade elements are arranged with their flexure leaves all adjacent one sidewall of the magnet and with their blade apertures on opposite sides of a fixed aperture provided in a camera mechanism plate located adjacent a second sidewall of the magnet. The two blade elements, which have to be electrically insulated from each other, are connected in series causing one blade element to move in one direction and the other blade element to move in the opposite direction. Such an arrangement provides a saving in space and components but the blade form flatness and mounting tolerances are tighter.

What is claimed is:

1. An exposure regulating element for a photographic camera comprising a one-piece sheet of light-weight, non-magnetic, electrically conductive metal, said sheet being stamped and formed to define a light regulating blade, resilient means for urging the light regulating blade toward an initial position, a coil support and a single turn conductor coil for generating a force to move the light regulating blade away from the initial position.

2. A camera having an exposure regulating element including (1) a light regulating blade, (2) an electromagnetic blade actuator comprising (a) a substantially planar conductor coil for conducting electrical current, (b) coil support means, (c) magnetic means for producing a magnetic field generally perpendicular to the plane of the conductor coil, and (d) means for supplying electrical current to the conductor coil, and (3) resilient means for urging the blade toward an initial position, characterized in that said light regulating blade, said resilient means, said conductor coil, and said coil support means comprise a single piece of stamped, light-weight, electrically conductive, non-magnetic, sheet metal.

3. The camera according to claim 2, characterized in that the light regulating blade, conductor coil, coil support means and resilient means are formed of a metal selected from the group consisting of, titanium and hard aluminum.

4. The camera according to claim 2 characterized in that the conductor coil includes at least one electrically conductive coil leg portion which generates forces for moving the light regulating blade away from the initial position, and the resilient means comprises two, substantially co-planar, flexure leaves.

5. The camera according to claim 2 characterized in that the exposure regulating element is an aperture/shutter blade.

6. A camera including a mechanism plate provided with a fixed aperture, first and second cooperating camera exposure control elements, such as first and second shutter blades, first and second aperture blades or the like, first and second flexure hinges for respectively urging the first and second camera exposure control elements toward an initial position covering the aperture, and an electromagnetic actuator for moving the camera exposure control elements in opposite directions to uncover the aperture, the actuator comprising (1) a first armature, including (a) a first substantially planar conductor coil for conducting electrical current in a first direction, (b) a first coil support means for supporting the first conductor coil for linear movement with respect to the aperture, and (c) first magnetic means for producing a magnetic field generally perpendicular to the plane of the first conductor coil and (2) a second armature, including (d) a second substantially planar conductor coil for conducting electrical current in a second direction, (e) a second coil support means for supporting the second conductor coil for linear movement with respect to the aperture, and (f) second magnetic means for producing a magnetic field generally perpendicular to the plane of the second conductor coil and (3) means for supplying electrical current to the first and second conductor coils, characterized in that said first conductor coil and said first coil support means are stamped and formed from a first piece of one to three mil thick, light-weight, non-magnetic, electrically conductive, sheet metal, said first conductor coil and said first coil support means being integrally formed in said sheet with said first camera exposure control element and said first flexure hinge, and said second conductor coil and said second coil support means are stamped and formed from a second piece of one to three mil thick, light-weight, non-magnetic, electrically conductive, sheet metal, said second conductor coil and said second coil support means being formed in said second sheet integrally with said second camera exposure control element and said second flexure hinge.

7. The camera according to claim 6 characterized in that the first and second camera exposure control elements, first and second conductor coils, and first and second flexure hinges are formed of a metal selected from the group consisting of, titanium, and hard aluminum.

8. The camera according to claim 6 characterized in that the first and second camera exposure control elements are first and second shutter/aperture blades.

* * * * *